United States Patent [19]

Alberty

[11] Patent Number: 6,085,351
[45] Date of Patent: Jul. 4, 2000

[54] SYNCHRONIZATION METHOD

[75] Inventor: Thomas Alberty, Backnang, Germany

[73] Assignee: Robert Bosch GmbH, Stuttgart, Germany

[21] Appl. No.: 09/011,245

[22] PCT Filed: Mar. 29, 1996

[86] PCT No.: PCT/DE96/00544

§ 371 Date: Jan. 30, 1998

§ 102(e) Date: Jan. 30, 1998

[87] PCT Pub. No.: WO97/07612

PCT Pub. Date: Feb. 27, 1997

[30] Foreign Application Priority Data

Aug. 16, 1995 [DE] Germany ............................ 195 29 982

[51] Int. Cl.[7] .................................................. G06F 11/00
[52] U.S. Cl. ............................................................. 714/798
[58] Field of Search ................................. 375/326, 280, 375/341, 262, 330; 714/798

[56] References Cited

U.S. PATENT DOCUMENTS

| | | | |
|---|---|---|---|
| 3,815,034 | 6/1974 | Kato ............................................ | 329/104 |
| 4,939,555 | 7/1990 | Calderbank et al. .................... | 375/286 |
| 5,654,986 | 8/1997 | Lim .......................................... | 375/341 |
| 5,703,887 | 12/1997 | Heegard et al. ......................... | 714/775 |
| 5,740,203 | 4/1998 | Ramaswamy et al. .................. | 375/341 |

OTHER PUBLICATIONS

Fines et al., Synchronization Technique for MultiCarrier QPSK Demodulators, IEEE, 1989, pp.1 to 6.
Efstathiou et al. Preamble–Less Non–Decision–Aided (NDA) Technique for 16–QAM Carrier Phase Recovery and Gain Error Correction, For Burst Trasmissions, IEEE, 1993, pp. 1090 to 1094.
Fettweis, Novel 6–PSK Trellis Codes, IEEE, 1993, pp. 106 to 110.
Moeneclaey et al., Sufficient Conditions on Trellis–Coded Modulation for Code–Independent Synchronizer Performance, IEEE, 1990, pp. 595 to 601.
"Frequency detector for PLL acquisition in timing and carrier recovery", by David G. Messerschmitt, IEEE transactions on Communication, vol. CO.–27, No. 9, Sep.1979.
"Channel coding with multilevel phase signals", by Gottfried Ungerboeck, IEEE transactions on information theory, vol. IT–28, No. 1, Jan. 1982.
"Joint synchronization and demodulation of Trellis Codes", by Nick A. Van Stralen and Desmond P. Taylor, 8089 IEEE Transactions on Communication 42 (1994) Jun., No. 6, New York, US.
"The Viterbi Algorithm", proceedings of the IEEE, vol 61, No. 3, Mar. 1973, pp. 268–278.
Channel coding with miltilevel/phase signals, by G. Ungerboeck, IEEE IT–28, No. 1, Jan. 1982, pp.55–67.

*Primary Examiner*—Albert De Cady
*Assistant Examiner*—Shelly A Chase
*Attorney, Agent, or Firm*—Michael J. Striker

[57] ABSTRACT

The method of synchronizing a receiver in a coded data transmission by means of an M-stage channel symbol alphabet, which includes dividing the channel symbol alphabet into a number of K not necessarily equal-sized groups (I,II) with K greater than one, so that at least one group contains less than M channel symbols; and either making preliminary or final data decisions in a data decoder, then making group membership decisions based on the preliminary or final data decisions and continuously using the group membership decisions for selecting a parameter detector (1, 2, . . . , K) or a parameter detector characteristic curve corresponding to an applicable group according to the group membership decisions; or making a group membership decision based on redundancies of received channel symbols present in the coded data transmission and then using the group membership decision for continuously selecting the parameter detector or the parameter detector characteristic curve according to the group membership decision; or determining a probability for group membership in at least one group based on the redundancies of the received channel symbols present in the coded data transmission and then using this probability for selecting weighting factors for output signals of the parameter detector corresponding to the concerned group.

40 Claims, 5 Drawing Sheets

SYNCHRONIZATION METHOD

BACKGROUND OF THE INVENTION

1. Field of the Invention

The present invention relates to methods of synchronizing a receiver in a coded data transmission.

2. Prior Art

In data signal transmission, coding is often employed, for instance to enable reducing the required transmission energy per data bit for the same error rate. Reducing the transmission energy per data bit, however, leads to an impairment in the synchronization of the demodulator, which is already problematic anyway in particular in higher-stage modulation methods. In that case, one possibility for improvement is to use estimated values $c''_i$ of the data decoder for the channel symbols $c_i$ actually transmitted. Such a method is described in reference 1, a paper by Ungerboeck, "Channel Coding with Multilevel/Phase Signals"), IEEE IT-28, No. 1, January 1982, pages 55–67, especially FIG. 17).

However, this method is problematic in two ways. First, these estimated values are present only in delayed fashion; that is, stability problems can arise in the close-loop control circuit, or control loop, comprising the demodulator and the data decoder that is created by the feedback. Second, the data decoder means a high-level nonlinearity with memory in the control loop, making the initial synchronization problematic, and under some circumstances the closed-loop control circuit can remain for relatively long periods in unstable states of equilibrium, known as "false locks".

SUMMARY OF THE INVENTION

It is an object of the present invention to provide an improved method of synchronization of a receiver in a coded data transmission of the above-described kind, that does not have the above-mentioned disadvantages.

According to the invention the method of synchronizing a receiver in a coded data transmission by means of an M-stage channel symbol alphabet, comprises:

a) dividing the channel symbol alphabet into a number of K not necessarily equal-sized groups (I,II) with K greater than one, so that at least one group contains less than M channel symbols; and b) either making preliminary or final data decisions in a data decoder, then making group membership decisions based on the preliminary or final data decisions and continuously using the group membership decisions for selecting a parameter detector (1, 2, . . . , K) or a parameter detector characteristic curve corresponding to an applicable group according to the group membership decisions; or making a group membership decision based on redundancies of received channel symbols present in the coded data transmission and then using the group membership decision for continuously selecting the parameter detector or the parameter detector characteristic curve according to the group membership decision; or determining a probability for group membership in at least one group based on the redundancies of the received channel symbols present in the coded data transmission and then using the probability for selecting weighting factors for output signals of the parameter detector corresponding to the concerned one of the groups.

By means of the synchronization method of the invention, it is possible in the closed- or open-loop control circuit of a synchronization device to shorten the delay time and to improve the initial synchronization.

Advantageous features of the invention will become apparent from the dependent claims.

The essential characteristic of the invention is the use of a parameter detector for a channel symbol alphabet with N stages, in data transmission with a channel symbol alphabet with M stages, where 1<N<M, so that the information required by the data decoder is reduced. An advantage on the one hand is that this reduced information can be furnished by the data decoder with a shorter delay time, as shown in the parallel patent application entitled "Datendecoder" [Data Decoder] filed on the same date as the present application by the same Applicant, and on the other that as a result there are fewer unstable equilibrium points in the closed-loop control, and thus the initial synchronization is less problematic.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF EXEMPLARY EMBODIMENTS

Figure 1:
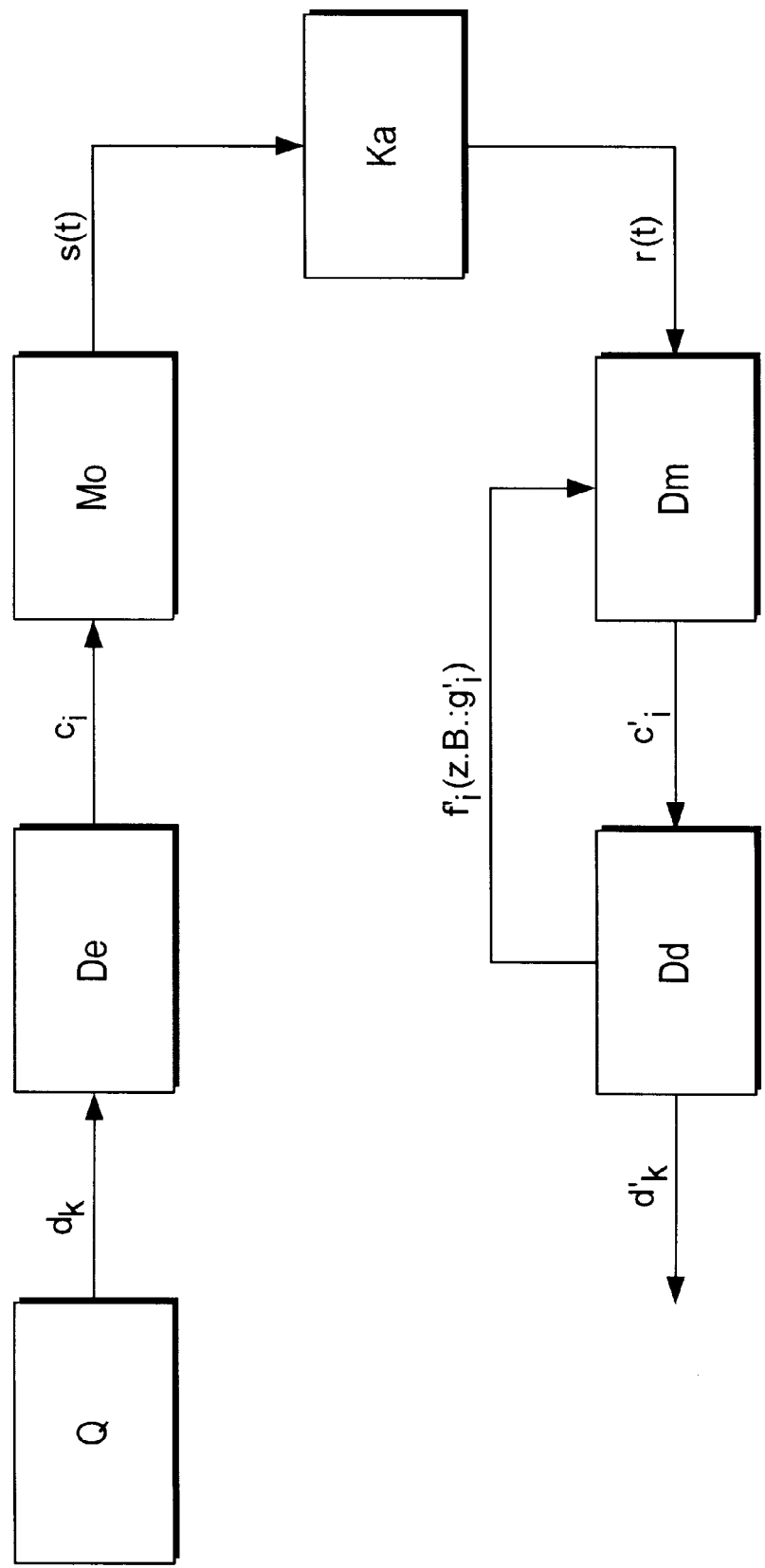
FIG. 1 shows a basic circuit diagram of the transmission system.

In FIG. 1, the source Q generates a train of data bits $d_k$, which is delivered to a data encoder De. The data encoder generates a train of channel symbols $c_i$, which is delivered to a modulator Mo. If the transmission is based on a QPSK modulation, for instance, then the channel symbols $c_i$ are elements of a four-stage channel symbol alphabet; that is, $c_i \in \{1, j, -1, -j\}$, in which j is the imaginary unit.

These four possible channel symbols are represented in FIG. 2 are points in the complex plane. The modulator Mo finally generates the actual transmission signal s(t) for transmission over the channel Ka.

In the receiver, the received signal r(t) is delivered to a demodulator Dm. The demodulator furnishes the train of estimated values $c'_i$ for the channel symbols, optionally provided with quality standards, which are delivered to a data decoder Dd. The data decoder, finally, determines the train of estimated data bits $d'_k$. It also furnishes a train of values $f_i$, which are delivered to the demodulator Dm. In the method disclosed in reference 1, $f_i$ would be a train of improved estimated values $c''_i$ for the channel symbols, while in a method according to the invention $f_i$ is a train of estimated values $g'_i$ for membership in a channel symbol group, possibly provided with corresponding quality standards.

Figure 2A:
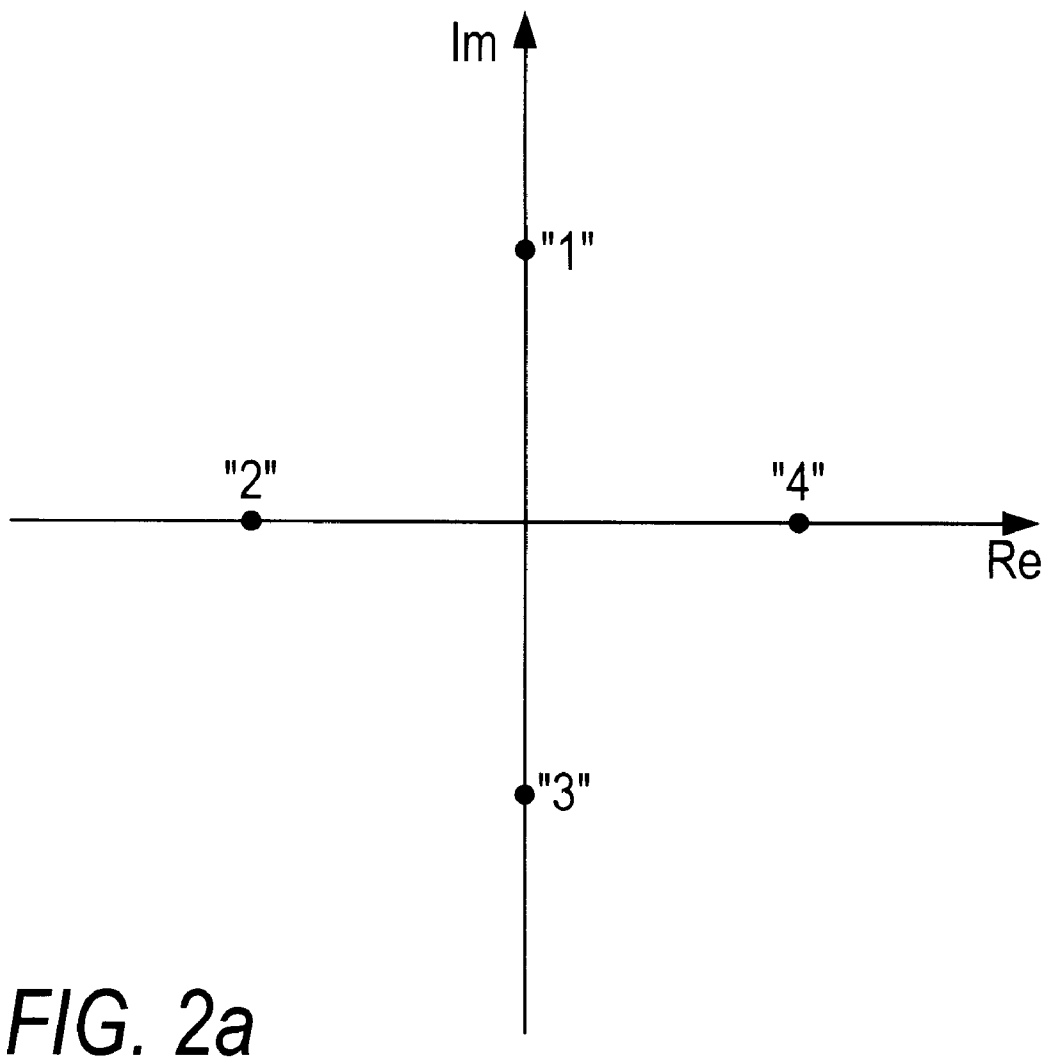
FIG. 2a illustrates the location of the channel symbols in QPSK modulation.
Figure 2B:
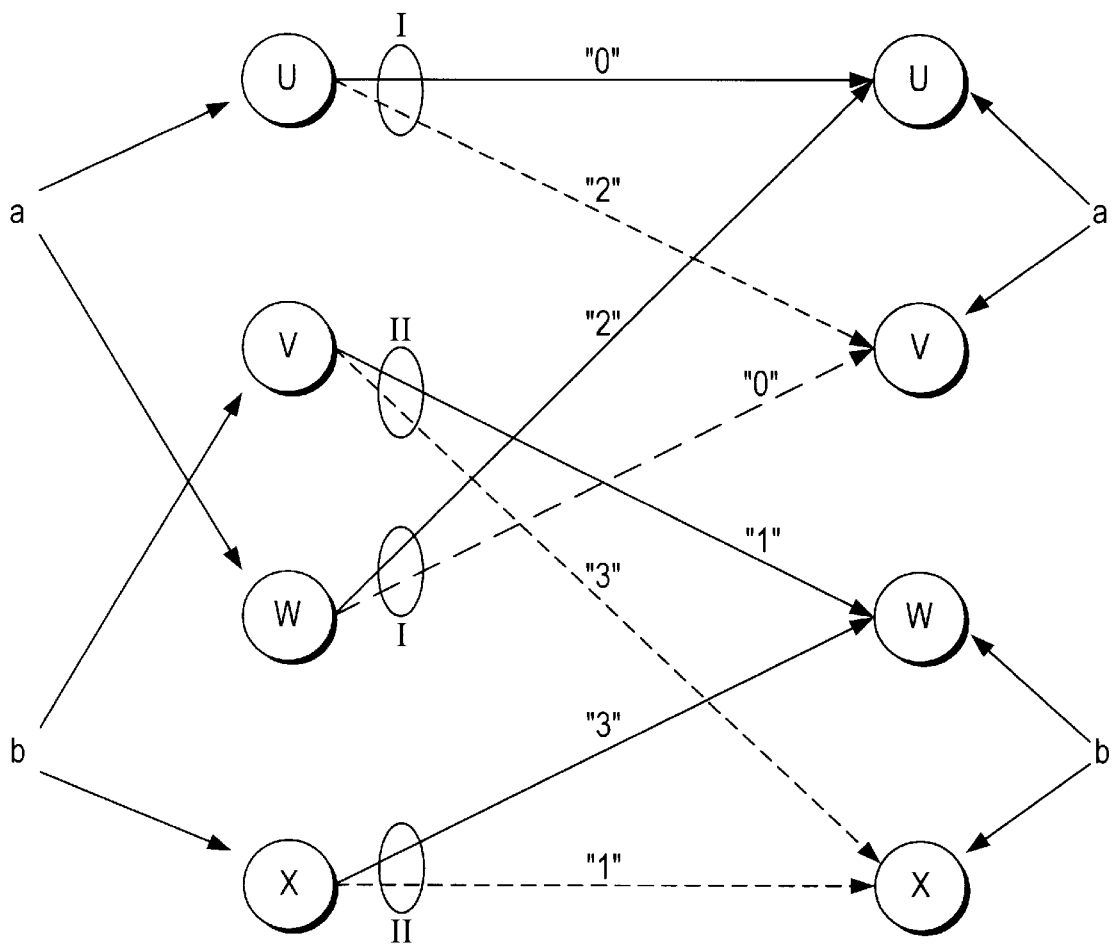
FIG. 2b shows a state transition diagram of the coding, also known as a trellis diagram.

To illustrate the principle of determining the estimated values for the group membership, FIG. 2b shows a simple state transition diagram for a convolution code with a rate of ½ in QPSK. At each time, the data encoder De is in one of the four states U, V, W, X represented by circles. If the data encoder De receives the next data bit $d_k$ from the source Q, then when $d_k=0$ it takes the path indicated by the solid-line arrow, while when $d_k=1$ it takes the path indicated by the dashed-line arrow. This accordingly defines the transition to the next state. The numbers on each of the arrows each define the next channel symbol, which is delivered to the modulator Mo. The data decoder Dd in the receiver is likewise based on this state transition diagram. Determining the train $d'_k$ is then equivalent to determining the most probable path through the state transition diagram. To that end, the data decoder Dd at each time i for each state z determines a so-called path metric $p_{z,i}$, which represents a standard for the probability that the path at time i runs through this state z (i=0, 1, 2, 3, . . . ). With the aid of the estimated value $c'_{i+1}$ from the demodulator Dm, possibly including an associated quality standard, the data decoder Dd then determines the corresponding path metrics at time i+1. This procedure is described at length in the paper by Forney, "The Viterbi Algorithm", of the Proceedings of the IEEE, Volume 61, No. 3, March 1973, pages 268–278. For describing the method on which the invention is based, the only significant aspects are that these path metrics $p_{z,i}$ exist, and that they are a standard for the probabilities of the states at time i.

From the state transition diagram it can be learned that only two channel symbols lead away from each state. If the channel symbol alphabet is divided into two channel symbol groups I and II, where channel symbol group, I contains the two symbols "0" and "2" while channel symbol group II contains the two symbols "1" and "3", then only the channel symbols of one channel symbol group can lead away from each state. In other words, with the aid of the path metrics, at time i an estimated value can be derived for the group membership at time i+1. In the simplest case, to that end only what at the moment is the most probable state is determined, and the associated designation of the channel symbol group that is capable of leading away from this state is sent on to the demodulator Dm. In the usual way in which path metrics are shown, the most probable state is designated by the minimal path metric, so that only the state having the minimal path metric needs to be determined.

Figure 3:
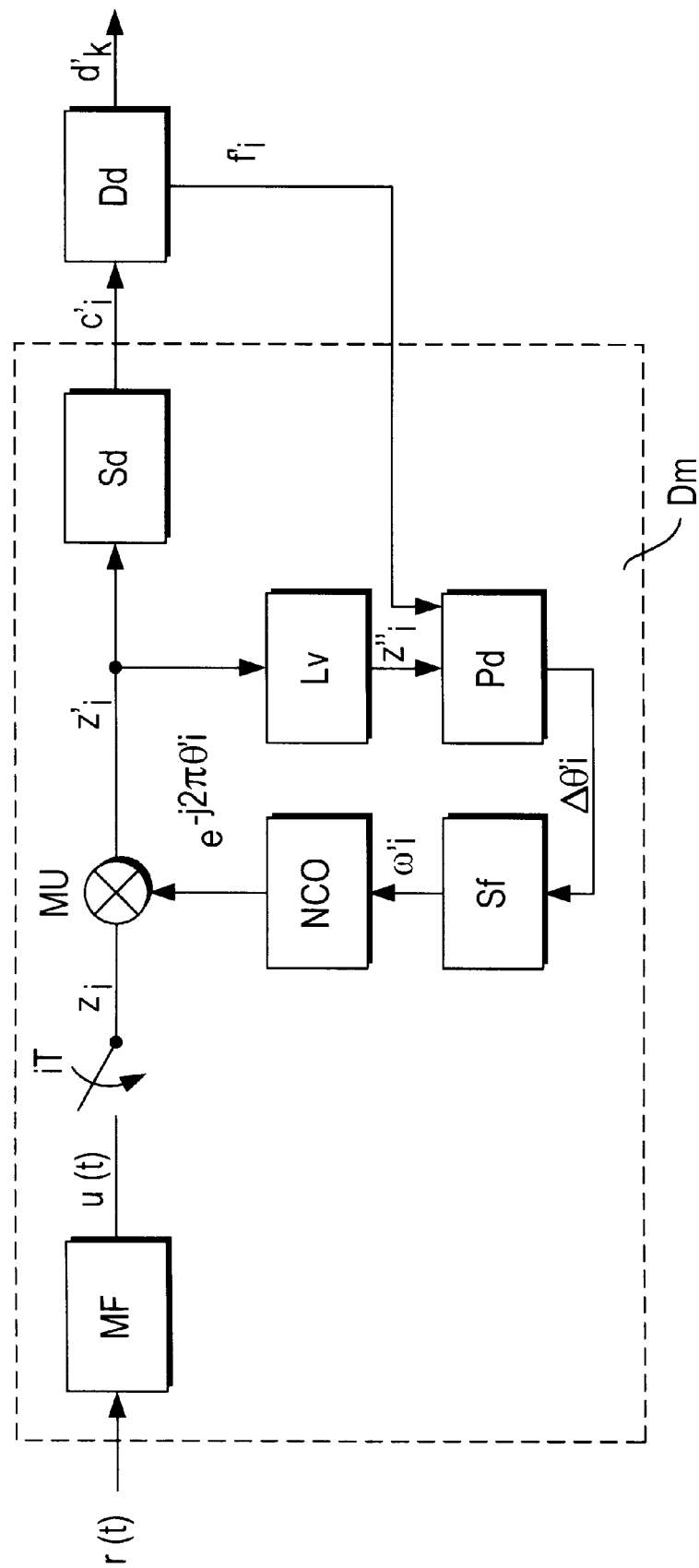
FIG. 3 shows a basic circuit diagram of the receiver.

To explain the use of the method of the invention, a fed-back carrier phase synchronization in MPSK modulation will now be looked at. A basic circuit diagram of a demodulator (Dm in FIG. 1) for this is shown in FIG. 3. The received signal r(t) is first delivered to a matched filter MF. The output signal u(t) of the matched filter is sampled at the optimal sampling times t=iT, where T is the symbol duration of the MPSK modulation. Next, the carrier phase is corrected with the aid of a multiplier Mu, resulting in the sampled values $z'_i$. From them, the soft decision values $c'_i$ are ascertained in a component group Sd, and are delivered to the data decoder Dd. This decoder finally determines the desired data bits $d'_k$ and in addition the values $f'_i$, which are needed for the synchronization. So that these values $f'_i$ can be used to determine the residual carrier phase error of the values $z'_i$, the latter are delayed in a delay member Lv in accordance with the transit time of the data decoder, resulting in the values $z''_i$. From $z''_i$ and $f'_i$, a parameter detector Pd, which in the case of closed-loop carrier phase control is as a rule called a phase detector, determines the residual phase error $\Delta\Theta'_i$, and from that, with the aid of a loop filter Sf and a numerically controlled oscillator NCO, the rotation factor $e^{-j2\pi\Theta'i}$, required for the carrier phase correction, is ascertained. The carrier synchronization is thus equivalent to a typical phase-locked loop, but the phase detector Pd additionally uses the values $f'_i$ of the data decoder Dd.

The mode of operation of the phase detector will now be described, using MPSK modulation as an example. It is assumed that in the ideal case, that is, without carrier phase errors and without any other disturbances, the channel symbols are located at the M set points $s_m$, where $$s_m = e^{j2\pi m/M}$$

and where m $\in$ [0, 1, . . . , M−1] (as shown in FIG. 2a for QPSK).

If there are no values $f'_i$ available from the data decoder, then a normal phase detector for MPSK must be used. One possibility then is for instance to determine the phase difference between the value $z'_i$ and the next-closest set point sm. The phase error $\Delta\Theta'_i$ is then obtained by the equation $$\Delta\Theta'_i = \arg[z'^M_i],$$

or in other words, the determination of the phase of the value $z'_i$ taken to the Mth power.

If conversely, as in the method indicated in reference 1, an estimated value for the channel symbol is available from the data decoder, that is, if $f'_i$ stands for the number m of the corresponding set point, then the signal $z'_i$ can be traced back to an unmodulated signal by multiplication by $e^{-j2\pi f'_i/M}$; that is, the set point of this signal is always at $s_0$, and the phase error can be determined for instance in accordance with the equation $$\Delta\Theta'_i = \arg[z'_i e^{-j2\pi f'_i/M}].$$

To explain the use of reduced information from the data decoder, the special case of QPSK will first be considered. The associated location of the set points in the complex plane for this has already been shown in FIG. 2a. The four possible channel symbols are now divided into two groups I and II. The channel symbols "0" and "2" are assigned to group I, and the channel symbols "1" and "3" are assigned to group II (FIG. 2b). Group I is thus equivalent to the usual configuration in BPSK, while group II is equivalent to a BPSK configuration rotated by pi/2. If the data decoder, by means of the signal $f'_i$, furnishes the information as to which group a channel symbol belongs to, then a phase detector adapted for the group can be used; if it belongs to group I, then a normal BPSK phase detector can be used, or in other words the phase error can be determined for instance in accordance with the equation $$\Delta\Theta'_i = \arg[z'^2_i].$$

Conversely, if it belongs to group II, the signal $z'_i$ can be traced back, by rotating it by −pi/2, to a normal BPSK configuration, and then a normal phase detector for BPSK can be used; that is, the phase error can be determined for instance by $$\Delta\Theta' = \arg[(-jz'_i)^2].$$

If the definition is made that $f'_i=0$ means membership in group I, and $f'_i=1$ means membership in group II, then the determination of the phase error for both cases can also be represented by $$\Delta\Theta'_i = \arg[(1-2f'_i) \cdot z'^2_i].$$

Figure 4:
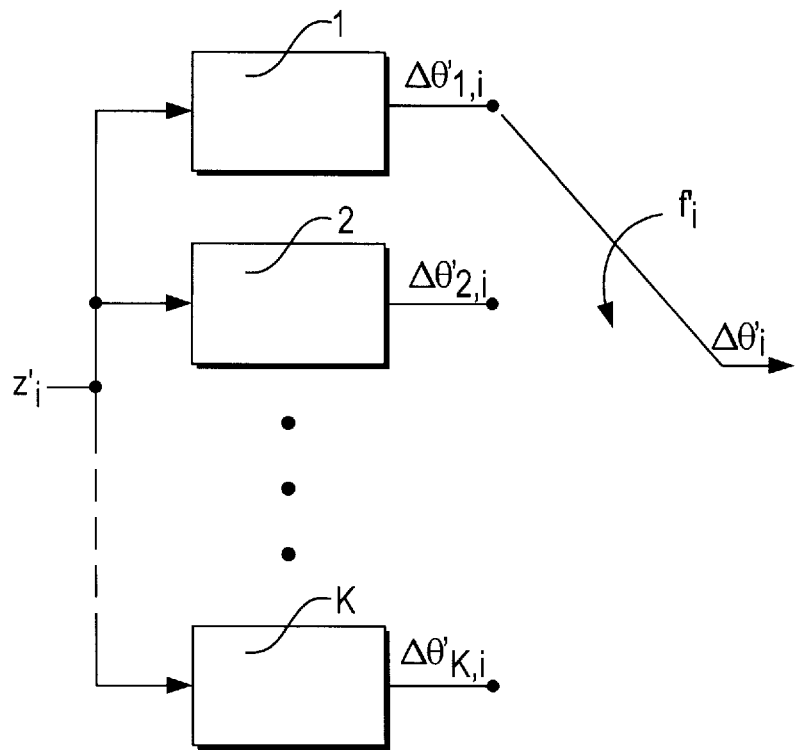
In FIG. 4, one possible realization of the parameter detector is shown.

The example of QPSK modulation with the division into two BPSK channel symbol groups rotated relative to one another can naturally be applied directly to other types of modulation as well. In MPSK modulation, for example, a division into two M'PSK channel symbol groups (where M'=M/2) rotated relative to one another, or into four M"PSK channel symbol groups (where M'=M/4) rotated relative to one another, can be done. In general terms, a channel symbol alphabet with M stages can be divided into K groups, not necessarily of equal size, and each group contains fewer than M symbols. These groups may possibly even be overlapping, or in other words one or more channel symbols may be included in more than one group. In that case, the phase detector can be realized as shown in FIG. 4, for example. The signal $z'_i$ is delivered to K processing blocks, and the $r^{th}$ block represents a phase detector for a symbol configuration corresponding to the $r^{th}$ channel symbol group, and $1 \leq r \leq K$. Depending on the signal $f_i$ furnished by the data decoder, which signal after all provides information on the group membership, the output signal of the phase detector that belongs to this group is then used. If the definition is made that $f_i=r$ designates membership in the $r^{th}$ group, then the phase error $\Delta\Theta'_i$ is provided by the equation $\Delta\Theta'_i=\Delta\Theta'f_{i,i}$, where $\Delta\Theta'_{r,i}$ represents the output signal of the phase detector for the $r^{th}$ group. But if the channel symbol groups differ from one another only in the rotation, then as in the above example of QPSK modulation the signal $z'_i$ can initially be traced back to a single group by means of a rotation determined by $f_i$, and then only one phase detector for a single group is needed.

If the data decoder additionally furnishes a quality standard $\alpha_i$ for the group decision $g'_i$ that has been made, than the output signal can naturally also be weighted in accordance with the quality. This can be done for instance by simple multiplication, if $\alpha_i \geq 0$ and if greater values of $\alpha_i$ designate a higher reliability of the group decision.

Figure 5:
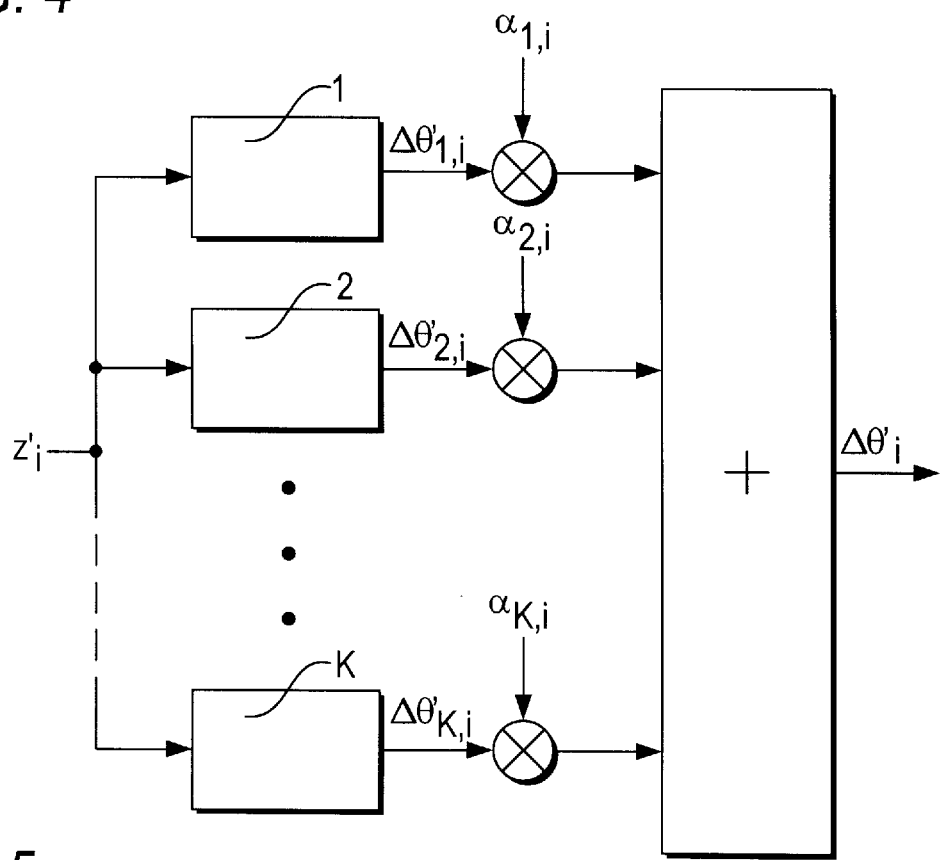
FIG. 5 shows another possible realization of the parameter detector.

If the data decoder furnishes one quality standard for each of the K groups, that is, $\alpha 1,i, \alpha 2,i, \ldots, \alpha K,i$, then it is also possible in accordance with FIG. 5 to add up the output signals, weighted in accordance with their quality, of all K phase detectors for the K groups using an adder Ad, so as to obtain a phase error signal for the control loop.

If the data decoder as in reference 1 furnishes estimated values for the channel symbols $c'_i$, then these values can be converted into a group decision, for instance by means of a table. If the group division is then chosen such that there are fewer groups than channel symbols, then $f'_i$ contains less information than $c''_i$, with the consequence that $f'_i$ has less error and is thus less problematic, especially for the initial phase of the synchronization.

Alternatively, with the estimated data bits $d'_k$ of the data decoder Dd, these estimated values $c''_i$ could be obtained as in reference 1 and then converted into the group decision as described above.

In both cases, a decision with regard to the data bits $d_k$ or the channel symbols $c_i$ is made, which will hereinafter summarily be called a data decision.

The method of the invention can naturally also be employed with other synchronization or compensation devices, in which case different names are merely used. In carrier frequency synchronization, the parameter detector is as a rule called a frequency error detector, and its output signal is accordingly called a frequency error. In clock phase or clock frequency synchronization, the same terms as in carrier phase or carrier frequency synchronization are typically used. In amplitude regulation, the parameter detector is as a rule called a level detector, and its output signal is called a level error. In quadrature error synchronization (or more accurately, quadrature error compensation), the terms "quadrature error detector" and "quadrature error" are used.

Instead of the reverse closed-loop control described, forward closed-loop control can also be performed.

What is claimed is:

1. A method of synchronizing a receiver in a coded data transmission by means of an M-stage channel symbol alphabet, said method comprising the steps of:
   a) dividing the channel symbol alphabet into a number of K not necessarily equal-sized groups (I,II) with K greater than one, so that at least one of said groups contains less than M channel symbols; and
   b) either making preliminary or final data decisions in a data decoder, then making group membership decisions based on said preliminary or final data decisions and continuously using the group membership decisions for selecting a parameter detector (1, 2, . . . , K) or a parameter detector characteristic curve corresponding to an applicable one of said groups according to said group membership decisions; or making a group membership decision based on redundancies of received channel symbols present in said coded data transmission and then using the group membership decision for continuously selecting the parameter detector or the parameter detector characteristic curve according to the group membership decision; or determining a probability for group membership in at least one of said groups based on the redundancies of the received channel symbols present in the coded data transmission and then using said probability for selecting weighting factors for output signals of the parameter detector corresponding to the concerned one of the groups.

2. The method as defined in claim 1, wherein the groups are equal-sized and said K is less than said M for each of said groups.

3. The method as defined in claim 1, wherein the channel symbol alphabet is divided into two of said groups.

4. The method as defined in claim 1, wherein said group membership decisions are derived from a state metric of a Viterbi decoder.

5. The method as defined in claim 1, wherein said dividing of the channel symbol alphabet into said groups (I,II) occurs in such a manner that only channel symbols of one group can occur, leading away from each state of a transmission state diagram underlying the coding.

6. The method as defined in claim 1, wherein said dividing of the channel symbol alphabet of one group (I or II) can occur, leading to each state of a transmission state diagram underlying the coding.

7. The method as defined in claim 1, further comprising determining a momentary most probable state in a transmission state diagram at each time and deriving a corresponding group membership decision from said momentary most probable state.

8. The method as defined in claim 7, further comprising providing another parameter detector suitable for an M-stage channel symbol alphabet, and further comprising deriving a quality factor for the group membership decisions or for said probability for group membership in at least one of the groups from said redundancies present in the coded data transmission and weighting the output signals of the said parameter detector according to said quality factor.

9. The method as defined in claim 8, further comprising using exactly one of the parameter detectors, according to said quality factor.

10. The method as defined in claim 8, further comprising determining a probability of an instantaneously most probable state in each of said groups and said quality factor is derived from said probability.

11. The method as defined in claim 1, further comprising receiving a carrier comprising modulated oscillations having a phase and a frequency and correcting the phase together with the frequency of said carrier.

12. The method as defined in claim 1, further comprising receiving a carrier comprising modulated oscillations having a phase and a frequency, correcting the phase of said carrier and correcting the frequency of said carrier separately from correcting the phase.

13. The method as defined in claim 12, wherein at least one filtering occurs between said correcting of the phase of said carrier and said correcting of the frequency of the carrier.

14. The method as defined in claim 12, further comprising feeding a corrected input signal to at least one of said parameter detectors and wherein said corrected input signal includes an only-frequency-corrected carrier.

15. The method as defined in claim 1, further comprising feeding a corrected input signal to at least one of said parameter detectors and correcting an input signal for said at least one parameter detector to form said corrected input signal, and wherein said input signal comprises a carrier composed of modulated oscillations having a phase and a frequency and said correcting includes correcting said phase and said frequency of said carrier.

16. The method as defined in claim 1, further comprising feeding an input signal to at least one of said parameter detectors and wherein said input signal includes a carrier having an uncorrected frequency and an uncorrected phase.

17. The method as defined in claim 1, further comprising performing a carrier phase synchronization.

18. The method as defined in claim 17, wherein the performing of the carrier phase synchronization occurs by forwards regulation.

19. The method as defined in claim 17, wherein the performing of the carrier phase synchronization occurs by backwards regulation.

20. The method as defined in claim 17, wherein the performing of the carrier phase synchronization occurs partially by backwards regulation and partially by forwards regulation.

21. The method as defined in claim 1, further comprising performing a carrier frequency synchronization.

22. The method as defined in claim 21, wherein the performing of the carrier frequency synchronization occurs by forwards regulation.

23. The method as defined in claim 21, wherein the performing of the carrier frequency synchronization occurs by backwards regulation.

24. The method as defined in claim 21, wherein the performing of the carrier frequency synchronization occurs partially by backwards regulation and partially by forwards regulation.

25. The method as defined in claim 1, further comprising performing a clock phase synchronization.

26. The method as defined in claim 25, wherein the performing of the clock phase synchronization occurs by forwards regulation.

27. The method as defined in claim 25, wherein the performing of the clock phase synchronization occurs by backwards regulation.

28. The method as defined in claim 25, wherein the performing of the clock phase synchronization occurs partially by backwards regulation and partially by forwards regulation.

29. The method as defined in claim 1, further comprising performing a clock frequency synchronization.

30. The method as defined in claim 29, wherein the performing of the clock frequency synchronization occurs by forwards regulation.

31. The method as defined in claim 29, wherein the performing of the clock frequency synchronization occurs by backwards regulation.

32. The method as defined in claim 29, wherein the performing of the clock frequency synchronization occurs partially by backwards regulation and partially by forwards regulation.

33. The method as defined in claim 1, further comprising performing a level synchronization.

34. The method as defined in claim 33, wherein the performing of the level synchronization occurs by forwards regulation.

35. The method as defined in claim 33, wherein the performing of the level synchronization occurs by backwards regulation.

36. The method as defined in claim 33, wherein the performing of the level synchronization occurs partially by backwards regulation and partially by forwards regulation.

37. The method as defined in claim 1, further comprising performing a quadrature error compensation.

38. The method as defined in claim 37, wherein the performing of the quadrature error compensation occurs by forwards regulation.

39. The method as defined in claim 37, wherein the performing of the quadrature error compensation occurs by backwards regulation.

40. The method as defined in claim 37, wherein the performing of the quadrature error compensation occurs partially by backwards regulation and partially by forwards regulation.

* * * * *